United States Patent [19]
De Luca et al.

[11] 3,817,435
[45] June 18, 1974

[54] TANK HOLDER AND TRANSPORTER

[76] Inventors: Anthony F. De Luca, 2537 E. Clarendon Ave., Phoenix, Ariz. 85016; Eugene F. Creach, 1339 N. 36th Ave., Phoenix, Ariz. 85009; Michael H. Jones, 3802 N. 28th St., Phoenix, Ariz. 85016

[22] Filed: Mar. 23, 1972

[21] Appl. No.: 237,429

[52] U.S. Cl............ 224/45 AA, 294/31.2, 248/313
[51] Int. Cl............................................. B65d 87/00
[58] Field of Search.......... 224/45 AA, 42.38, 45 R, 224/49; 294/31.2; 248/313; 214/10.5 R

[56] References Cited
UNITED STATES PATENTS

| | | | |
|---|---|---|---|
| 2,571,433 | 10/1951 | Fine.................................. | 294/31.2 |
| 2,655,300 | 10/1953 | Willms............................... | 294/31.2 |
| 2,850,182 | 9/1958 | Tetyak............................ | 214/10.5 R |
| 2,973,989 | 3/1961 | Harwood........................... | 294/31.2 |
| 3,116,947 | 1/1964 | Brownrigg.......................... | 294/31.2 |
| 3,310,270 | 3/1967 | Ciancio.............................. | 248/313 |

Primary Examiner—Robert G. Sheridan
Assistant Examiner—Kenneth Noland
Attorney, Agent, or Firm—Thomas D. Linton, Jr.

[57] ABSTRACT

This holder and transporter is for one or more tanks of the type containing oxygen and acetylene gases. Basically, it comprises a base, a handle and means connecting them, the latter serving to receive and secure at least one tank to the assembly. More specifically, the base is of channel shape to provide rigidity, the tank receiving means being a split band to encircle the tank and provide separated ends which are perforated to receive a fastener used in clamping the band to the tank, one of the ends having a handle formed thereon. The handle is offset relative to the band to provide a selected balance between the handle and the tank. If desired, the base may be shaped to give increased strength to light-weight material and provide spaced supporting surface engaging portions which make the holder stable on uneven surfaces. The holder may be adapted for use on a plurality of tanks.

6 Claims, 6 Drawing Figures

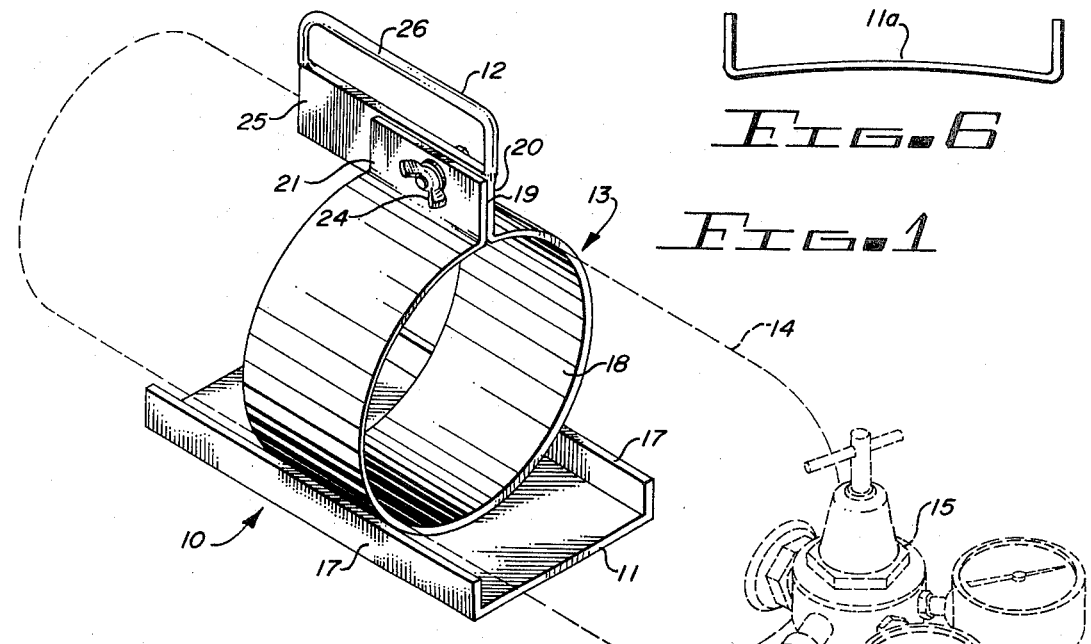
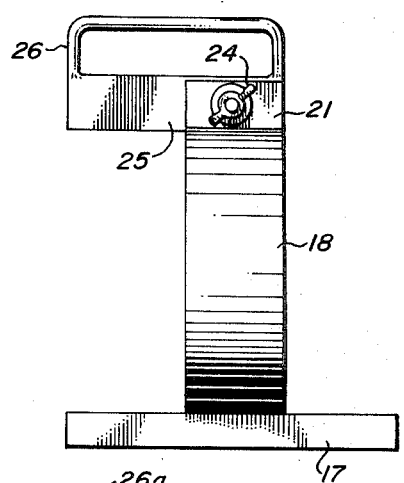
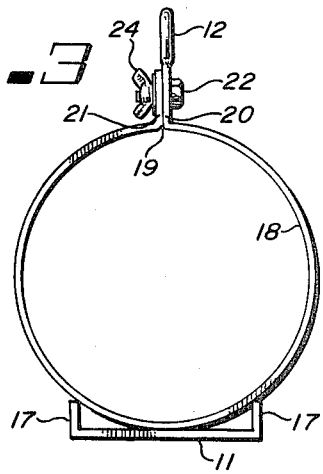
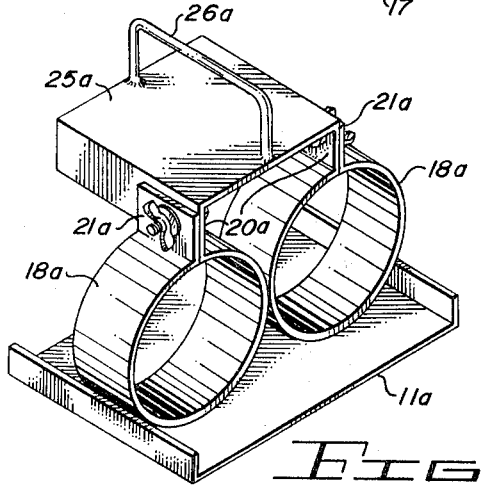
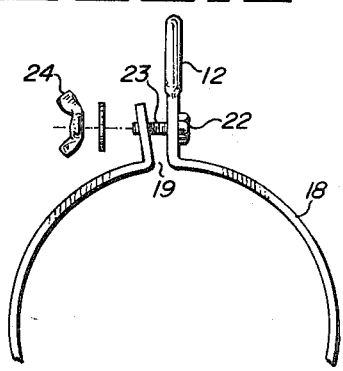

TANK HOLDER AND TRANSPORTER

SUMMARY

This invention relates generally to the welding or similar art but is more particularly directed to attachments or fixtures used in welding. Still more specifically, the invention is directed to a device for holding and transporting a tank such as used for oxygen and acetylene gases.

An object of this invention is to provide a simple device which may be readily clamped to one or more tanks and utilized to secure it or them against rolling movement and to facilitate the picking up and transportation of the tank or tanks from place to place when desired.

A further object of the invention is to provide a tank holder and transporter having a base and a handle and means connecting them which also functions to attach them to the tank to be held and/or transported.

A still further object is to provide the device mentioned in the preceding paragraph with the parts so arranged that the tank can be quickly and easily inserted and removed, that the tank will be balanced relative to the handle whereby it may be conveniently carried from place to place, and will hold the tank against rolling or other movement even when placed on rough supporting surfaces.

Another object is to provide a tank holder and supporter having a base, a split band for encircling a tank to be held, a handle at one end of the split band, and means for drawing the ends of the band together to clamp the base and handle to the tank; the band is secured to the base which is shaped to impart strength and provide spaced surface engaging portions.

Other objects and advantages will be apparent from the following description of holders formed in accordance with the invention and illustrated in detail in the accompanying drawing.

IN THE DRAWING

FIG. 1 is a perspective view of a holder embodying the invention with a tank therein shown in dotted lines;

FIG. 2 is a side elevational view of the holder shown in FIG. 1;

FIG. 3 is an end elevational view of the holder of FIG. 1 with the parts in a tank-holding position;

FIG. 4 is a fragmentary end elevation with the parts in a tank-releasing position;

FIG. 5 is a perspective view of a slightly modified form of the invention; and

FIG. 6 is a fragmentary end elevation showing a further modified form.

DESCRIPTION

More particular reference to the drawing discloses that the holder, designated generally by the reference numeral 10, is composed of three major parts: a base 11, a handle 12 and means 13 for securing the base and handle to the tank 14 to be held. The tank may be of almost any type, the one selected for illustration being cylindrical such as employed to contain oxygen, acetylene and similar gases and in the use of which are usually provided with a regulator 15 and one or more gages 16.

The base 11, in this instance, is of platelike form with side edges turned up, as at 17, to give the base a channel shape. The flanges 17 lend rigidity to the base and permit the use of a lighter gage of metal.

Secured (by welding or other suitable means) to the base 11, substantially midway between the ends, is a band 18 which is split, as at 19, to provide separable ends 20 and 21. These ends are bent at right angles to the band to form flanges. End 20 has a screw 22 secured thereto with the threaded portion 23 projecting toward end 21, the latter being formed with an opening for the reception of the portion 23 during the operation of clamping the band to the tank. Clamping is accomplished by threading a wing nut 24 onto the threaded shank 23 of the screw to draw the spaced ends of the band together. It will be obvious that the length of the band is calculated to make the band fit the tank snugly before the ends 20 and 21 engage one another to provide a secure clamping action.

As shown in the various figures of the drawing, the flange on end 20 of the band projects also to the side, as at 25, and has a bail-like element 26 secured thereto to form the handle 12. The projecting portion of the flange is of predetermined length, approximately equal to the band width, so that the handle will be partially disposed on the opposite side of the band from the regulator and gages and will thus provide a balanced condition when the assembly is picked up for transportation or other handling.

As indicated in FIG. 6, the bottom plate of the base may be crowned slightly, as at 27, to further strengthen or increase its rigidity and also provide spaced regions 28 for engaging a surface on which the holder is positioned. Thus, if such surface is rough or uneven, the holder will be stable.

FIG. 5 shows a modified form of holder wherein the base 11a is wider and has a plurality of bands 18a arranged side by side and welded or otherwise secured to the base and one another. The bands 18a are also of the split type with the spaced ends bent to provide flanges 20a and 21a. Ends 20a have a plate 25a secured thereto, the plate projecting to one side of the bands for balancing purposes, as in the first form. The portions 25 and 25a of the holders may be integrally formed with or may be welded or otherwise secured to the bands. As in the first form, a bail-like handle 26a is secured to the plate 25a so that the holder and tanks disposed therein may be conveniently positioned and handled as in the first instance.

As in FIG. 6, the bottom plate of the base 11a may also be crowned to give it rigidity and make it stable when disposed on uneven surfaces.

While various forms of the invention have been shown and described, other modifications may be made without departing from the spirit and scope of the invention, as set forth in the following claims.

We claim:

1. A tank holder and transporter comprising:
   a. a base member;
   b. tank-receiving means mounted on said base member, said base member being provided with vertical opposite side edges so as to contact said tank-receiving means in no more than three planes tangent to said receiving means, said tank-receiving means including one continuous band for encircling the tank, said band being split so as to provide spaced ends, said spaced ends projecting at right angles from said band so as to form flanges on each end of said band, and securing means for drawing said flanges in contacting relationship to clamp the holder to the tank;

c. handle means; and d. means for securing the handle and tank-receiving means to a tank.

2. The tank holder and transporter of claim 1 in which the handle means is provided on one of the spaced ends.

3. The tank holder and transporter of claim 1 wherein said flanges are in contacting parallel relationship when said securing means draws said spaced ends together to clamp the holder to the tank.

4. The tank holder and transporter of claim 1 wherein one of said flanges has a projecting portion which extends beyond the opposite flange member, said projecting portion having a bail-like element secured thereto to form a handle.

5. The tank holder and transporter of claim 4 wherein said projecting portion is of predetermined length so that the handle will be partially disposed on the opposite side of said band from the heavy end of the tank contained within said holder.

6. The tank holder and transporter of claim 5 wherein said projecting portion has a predetermined length which is substantially equal to the width of said band.

* * * * *